(12) United States Patent
Yoo et al.

(10) Patent No.: US 6,400,666 B1
(45) Date of Patent: Jun. 4, 2002

(54) OPTICAL PICKUP DEVICE

(75) Inventors: Jang-hoon Yoo, Seoul; Kun-ho Cho, Suwon; Yong-hoon Lee, Suwon; Seok-jung Kim, Suwon; Seung-tae Jung, Seongnam; Chul-woo Lee, Seoul; Joong-eon Seo, Uiwang, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/635,520

(22) Filed: Aug. 9, 2000

(30) Foreign Application Priority Data

Aug. 9, 1999 (KR) .............................................. 99-32581

(51) Int. Cl.[7] .............................................. G11B 7/095
(52) U.S. Cl. .................................. 369/53.19; 369/44.32
(58) Field of Search ........................... 369/44.11, 44.12, 369/44.14, 44.23, 44.28, 44.29, 44.32, 44.34, 47.1, 53.1, 53.11, 53.12, 53.14, 53.19, 53.41, 112.01, 103

(56) References Cited

U.S. PATENT DOCUMENTS 6,078,554 A * 6/2000 Ootaki et al. ........ 369/44.32 X

* cited by examiner

Primary Examiner—Muhammad Edun
(74) Attorney, Agent, or Firm—Burns, Doane, Swecker & Mathis, L.L.P.

(57) ABSTRACT

An optical pickup device includes a light source for generating and emitting light, optical path changing means for changing a proceeding path of incident light, an objective lens for focusing incident light on a recording medium which has a recording surface where information is recorded and a protection layer, at the side where light is input, for protecting the recording surface, a main photodetector for detecting the information signal and/or an error signal by receiving the light reflected by the recording surface of the recording medium and passing through the objective lens and the optical path changing means, and an inclination detecting unit for detecting inclination of the recording medium by receiving the light emitted from the light source and reflected by the surface of the protection layer or the recording surface of the recording medium. Thus, since the inclination of the recording medium is detected using the light emitted from the light source and reflected by the surface of the protection layer or the recording surface of the recording medium, without an additional tilt sensor, the number of parts is reduced and the structure of the device is simplified.

9 Claims, 8 Drawing Sheets

OPTICAL PICKUP DEVICE

BACKGROUND OF THE INVENTION

1. Field of the Invention

The present invention relates to an optical pickup device, and more particularly, to an optical device which can detect a relative inclination between an objective lens and a recording medium.

2. Description of the Related Art

In general, an optical pickup device records/reproduces information signals while it moves across a recording medium such as a disk which is mounted on a turntable and rotates. When the rotating disk is inclined due to unevenness of the weight distribution, the recorded/reproduced signals deteriorate.

In particular, in the case of an optical pickup device adopting a light source for emitting light having a relatively short wavelength and an objective lens having a greater numerical aperture, in order to increase recording density, coma aberration is generated much due to the inclination of a disk so that deterioration of recording/reproducing signals is more severe.

Figure 1:
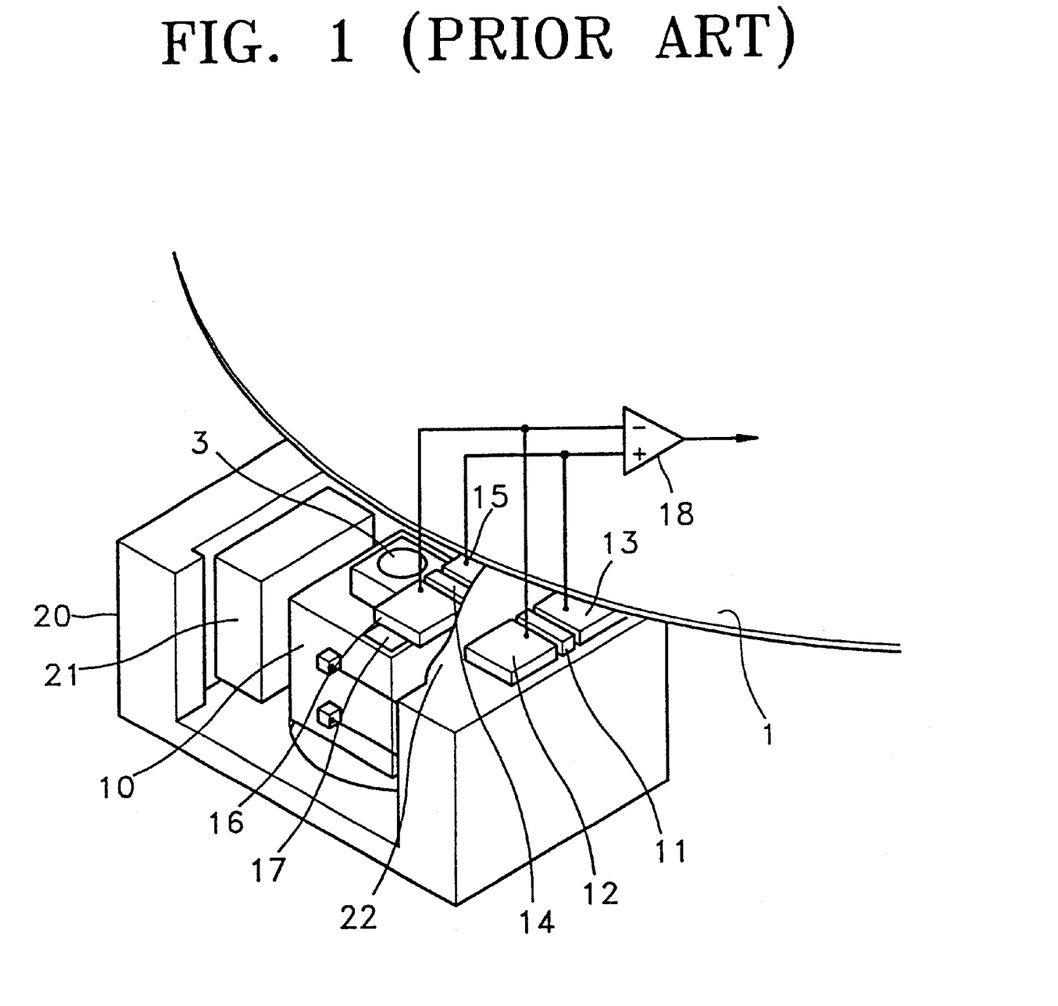
FIG. 1 is a perspective view showing the structure of the conventional disk inclination detecting apparatus.

An apparatus for detecting and correcting a relative inclination between a disk and a corresponding lens, as shown in FIG. 1, has been suggested to prevent the deterioration of the recording/reproducing signals.

Referring to FIG. 1, a holder 10 for supporting an objective lens 3 is movably installed at a main body 20. A first tilt sensor is installed on the outer surface of a top side portion 22 of the main body 20, facing a disk 1, while a second tilt sensor is installed on the inner surface of the top side portion 22. A reflection plate 17 is installed on the upper surface of the holder 10, facing the second tilt sensor. Here, coil members (not shown) are installed around the objective lens 3 fixedly installed at the holder 10 so that the objective lens 3 can be actuated by interaction with a permanent magnet 21 installed at one side wall of the main body 20. Although it appears in the drawing that the top side portion 22 is integrated with the main body 20, a cover member (not shown) is generally provided instead of the top side portion 22.

The first tilt sensor includes a light emitting diode 11, and a pair of photodiodes 12 and 13 disposed at either side of the light emitting diode 11, aligned in the radial direction. Light emitted from the light emitting diode 11 is reflected by the surface of the disk 1 and then received by the photodiodes 12 and 13. The amounts of light detected by the photodiodes 12 and 13 are the same when the disk 1 is not inclined with respect to the main body 20. When the disk 1 is inclined, the amounts of light detected by the photodiodes 12 and 13 are different from each other.

Likewise, the second tilt sensor includes a light emitting diode 14, and a pair of photodiodes 15 and 16 disposed at either side of the light emitting diode 14, aligned in the radial direction. Light emitted from the light emitting diode 14 is reflected by the reflection plate 17 installed on the upper surface of the holder 10 and then received by the photodiodes 15 and 16. The amounts of light detected by the photodiodes 15 and 16 are the same when the holder 10 is not inclined with respect to the main body 20. When the holder 10 is inclined, the amounts of light detected by the photodiodes 15 and 16 are different from each other.

In the above first and second tilt sensors, detection signals from the photodiodes 13 and 15 and the photodiodes 12 and 16 are input to (+) and (−) input terminals of a differential amplifier 18 where the signals are operated.

Figure 2A:
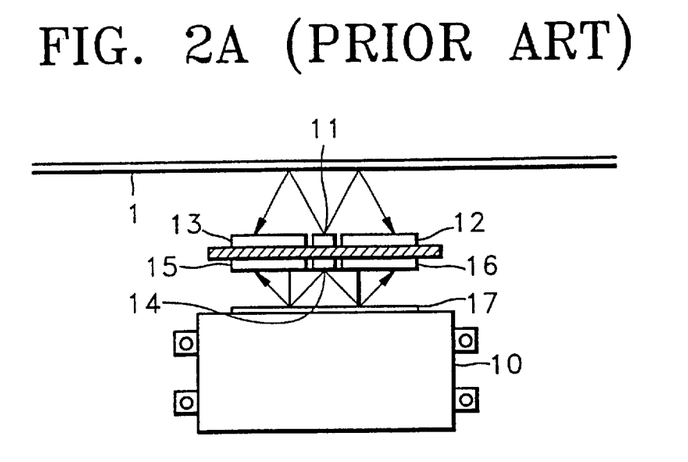
FIGS. 2A through 2C are sectional views showing the operation of detecting inclination of a disk and correcting the inclination in the conventional disk inclination detecting apparatus.

Thus, as shown in FIG. 2A, when the disk 1 and the objective lens 3 are not inclined, since the detection signals of the photodiodes 12 and 13 are the same and the detection signals of the photodiodes 15 and 16 are the same, an output signal value of the differential amplifier 18 is zero, which means that there is no relative inclination between the disk 1 and the objective lens 10.

Figure 2B:
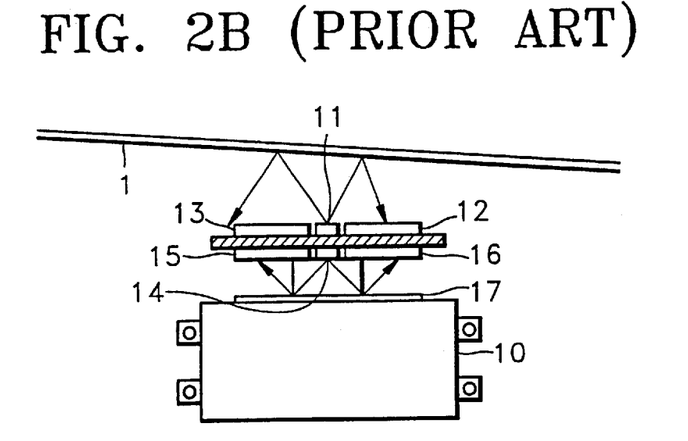

As shown in FIG. 2B, when the disk 1 is inclined to the main body 20 and the holder 10 is not inclined to the main body 20, the amount of light detected by the photodiode 12 increases while the amount of light detected by the photodiode 13 decreases. Here, the amounts of light detected by the photodiodes 15 and 16 are the same. In this case, the differential signal of the differential amplifier 18 is a positive value according to the difference of the detection signals of the two photodiodes 12 and 13.

Figure 2C:
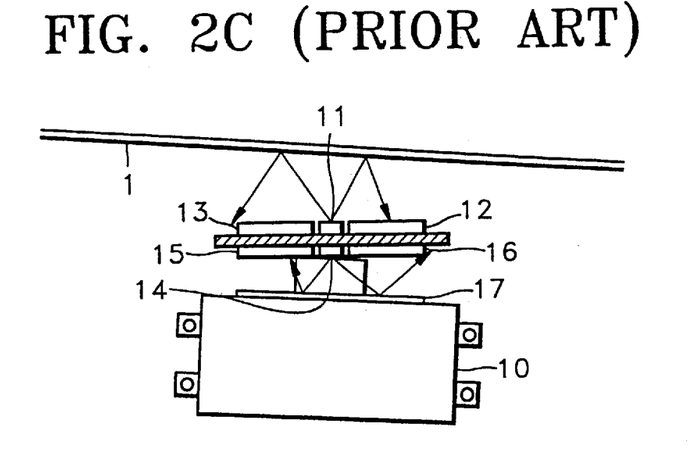

To correct the inclination of the disk 1, the holder 10 is made to be inclined to the same degree and in the same direction as that of the disk 1, as shown in FIG. 2C. Then, the amounts of light by the photodiodes 12 and 13 of the first tilt sensor are different from each other and simultaneously the amounts of light by the photodiodes 15 and 16 of the second tilt sensor are different from each other. However, the differential signal of the differential amplifier 18 is zero, which signifies that the inclination of the disk 1 is corrected and there is no relative inclination between the disk 1 and the objective lens 3.

As described above, in the conventional disk inclination detecting apparatus, the inclinations of the disk 1 and the holder 10 are detected and the objective lens 3 mounted on the holder 10 is made to be inclined with respect to the main body 20 to the same degree as the inclination of the disk 1 so that a relative inclination of the disk 1 to the objective lens 3 can be corrected.

However, in the above disk inclination detecting apparatus, since two or more additional tilt sensors are needed, the number of parts are many and the manufacturing cost is high. Also, since the reflection plate 17 is installed at the holder 10, a load on the actuating mechanism increases so that the actuating performance of an optical pickup device is lowered.

SUMMARY OF THE INVENTION

To solve the above problems, it is an objective of the present invention to provide an optical pickup device which can detect a relative inclination between an objective lens and a recording medium without an additional tilt sensor.

Accordingly, to achieve the above objective, there is provided an optical pickup device which comprises a light source for generating and emitting light, optical path changing means for changing a proceeding path of incident light, an objective lens for focusing incident light on a recording medium which has a recording surface where information is recorded and a protection layer, at the side where light is input, for protecting the recording surface, a main photodetector for detecting the information signal and/or an error signal by receiving the light reflected by the recording surface of the recording medium and passing through the objective lens and the optical path changing means, and an inclination detecting unit for detecting inclination of the recording medium by receiving the light emitted from the light source and reflected by the surface of the protection layer or the recording surface of the recording medium.

It is preferred in the present invention that the inclination detecting unit comprises a holographic lens, disposed on the optical path between the light source and the optical path changing means, for diffracting and transmitting light input from the light source, and an inclination photodetector, disposed at one side of the main photodetector to receive incident light reflected by the surface of the protection layer and passing through the objective lens and the optical path changing means, and formed of a plurality of split plates, each performing photoelectric-conversion independently, the split plates being arranged in a track tangential direction and/or a radial direction of the recording medium.

Also, it is preferred in the present invention that the holographic lens comprises a first transmitting portion for transmitting light a portion of the light emitted from the light source within a near-axis area used for recording and reproducing information signals, and a second transmitting portion, formed around the first transmitting portion, for transmitting a portion of the incident light withing a far-axis area, wherein one of the first and second transmitting portions allows incident light to pass straight therethrough and the other one diffracts and transmits the incident light to $+1^{st}$ or $-1^{st}$ order.

Also, it is preferred in the present invention that the inclination detecting unit comprises at least one inclination photodetector having a plurality of quadrant plates arranged in the track tangential direction and/or radial direction of the recording medium at at least one side of the main photodetector, to detect the light reflected by the surface of the protection layer.

Also, it is preferred in the present invention that the inclination detecting unit further comprises a holographic lens which is disposed on the optical path between the optical path changing unit and the objective lens and includes a first transmitting portion which is provided such that most light transmitting the first transmitting portion is the light reflected by the recording surface of the recording medium, and a second transmitting portion, formed around the first transmitting portion, for transmitting light reflected by the surface of the protection layer of the recording medium, wherein one of the first and second transmitting portions allows incident light emitted from the recording medium to pass straight therethrough and the other one diffracts and transmits the incident light emitted from the recording medium to $+1^{st}$ or $-1^{st}$ order.

Also, it is preferred in the present invention that the optical pickup device further comprises a collimating lens, disposed on the optical path between the holographic lens and the objective lens, for collimating the light output from the light source and passing straight through the first transmitting portion, so that light, excluding a part thereof from the outer circumference of the incident light reflected by the recording medium, can pass the collimating lens.

Also, it is preferred in the present invention that the inclination photodetector is provided at both sides of the main photodetector along the track tangential direction and/or the radial direction.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

Figure 3:
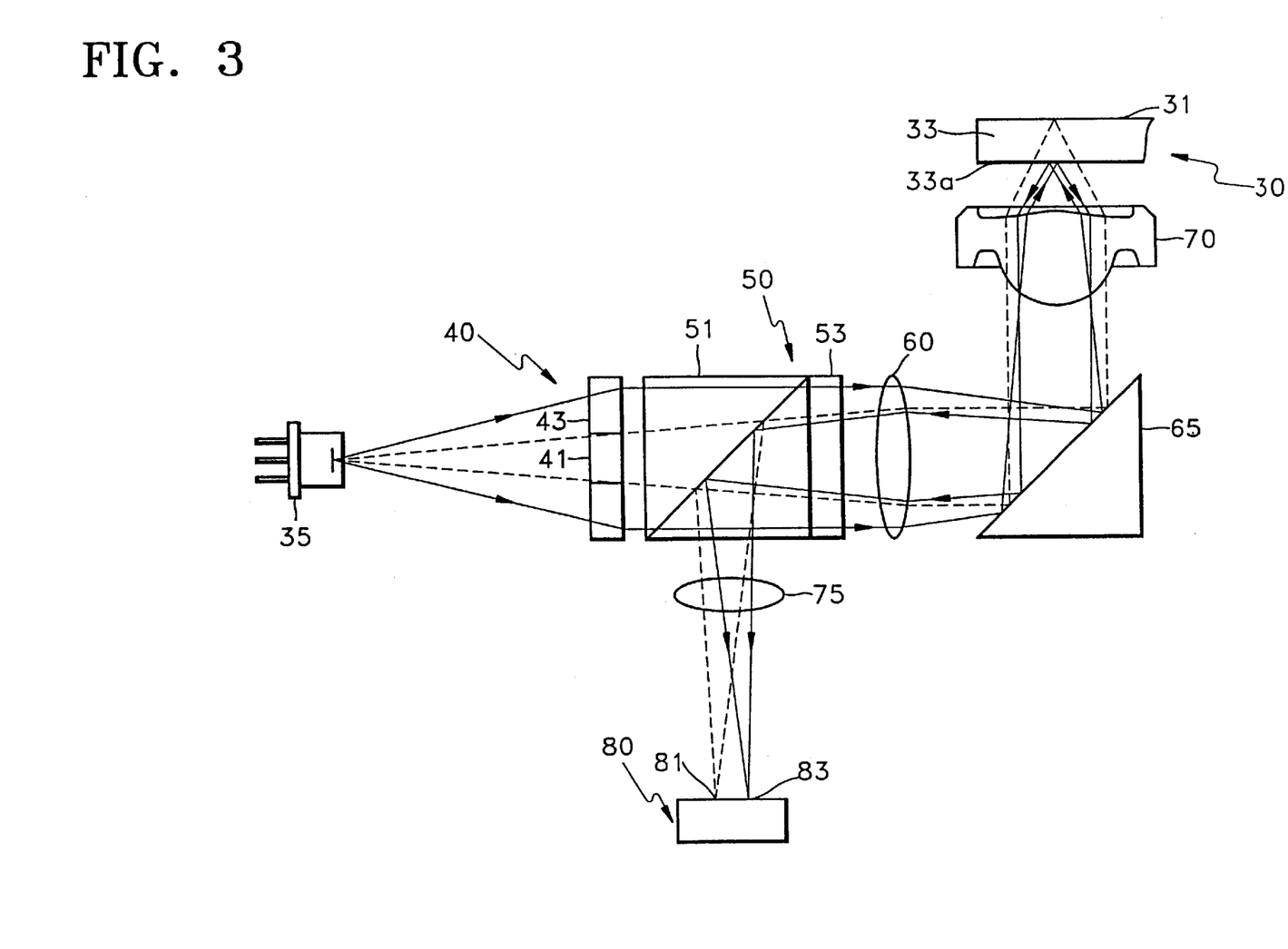
FIG. 3 is a view showing the configuration of an optical pickup device according to one preferred embodiment of the present invention.
Figure 10:
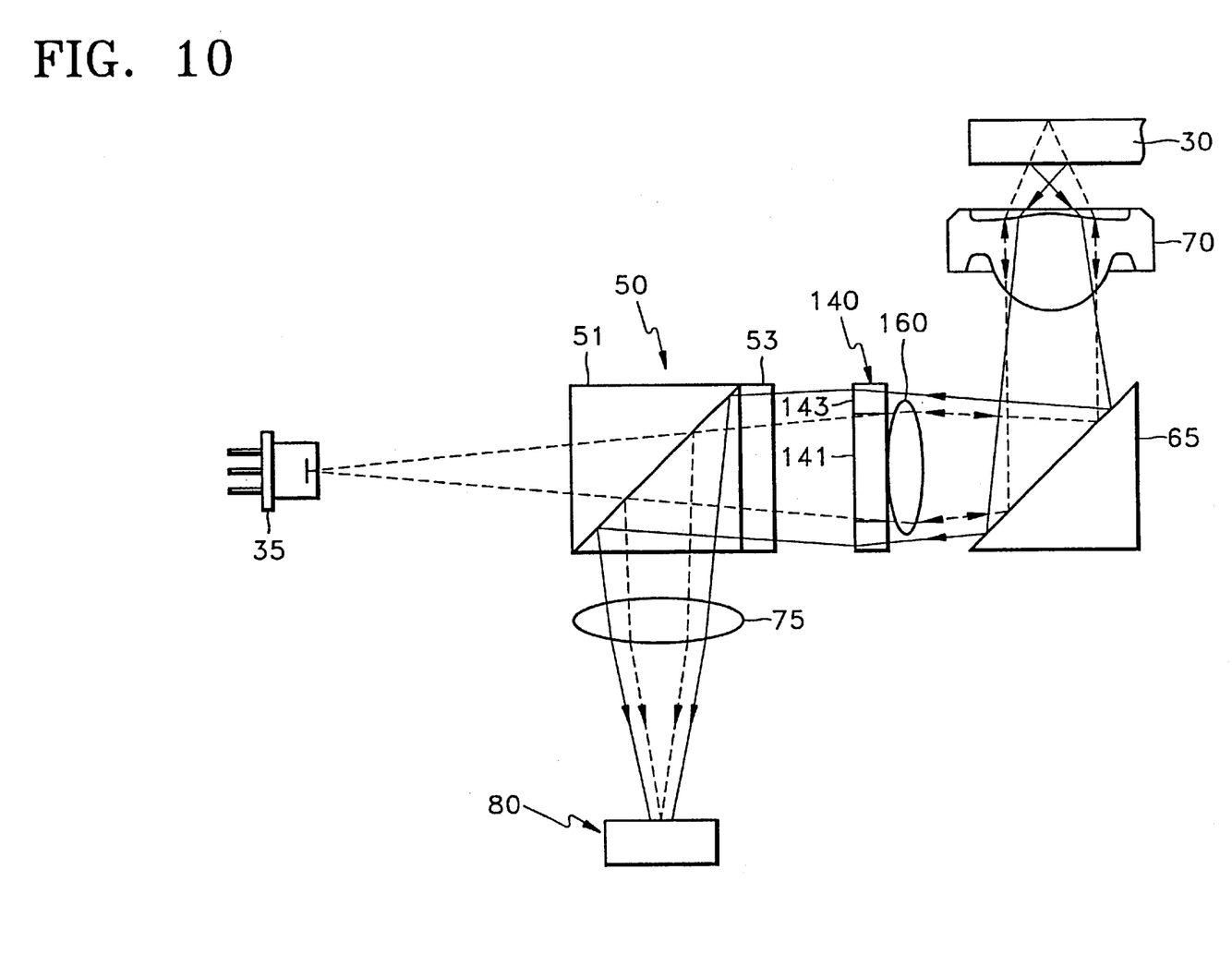
FIG. 10 is a view showing the configuration of an optical pickup device according to another preferred embodiment of the present invention.

An optical pickup device according to the present invention, as shown FIGS. 3 and 10, is characterized in that information signals are recorded on and reproduced from a recording medium 30, consisting of a recording surface 31 where the information signals are recorded, and a protection layer 33 for protecting the recording surface 31, which is provided on the recording surface 31 where light is input and simultaneously the inclination of the recording medium 30 can be detected.

Referring to FIG. 3, the optical pickup device according to one preferred embodiment of the present invention includes a light source 35 for generating and emitting light, an optical path changing means 50 for changing the proceeding path of incident light, an objective lens 70 for focusing incident light at the recording medium 30, a main photodetector 81 for detecting information signals and/or error signals, and an inclination detecting means for detecting inclination of the recording medium 30.

The light source 35, for example, is a semiconductor laser for generating and emitting a laser beam having on intensity distribution like a Gaussian distribution. The light emitted from the light source 35 is most intense in a near-axis area. Accordingly, light distributed in the near-axis area (indicated by a dotted line) is used for recording/reproducing information signals on/from the recording medium 30. According to the present invention, light distributed in a far-axis area (indicated by a solid line) which is formed around the near-axis area is used for detecting inclination of the recording medium 30. The light in the far-axis area is not used in a typical optical pickup device and will be lost because the intensity of the light is much weaker than the light in the near-axis area. Here, the ranges of the near-axis area and the far-axis area are relatively set.

The optical path changing means 50 is disposed on the optical path between the light source 35 and the objective lens 70, and transmits most light output from the light source 35 to proceed toward the recording medium 30, and also reflects incident light which has beam reflected by the recording medium 30 back through the objective lens 70 to proceed toward the a light detecting unit 80. The optical pass changing means 50, for example, as shown in FIG. 3, includes a polarizing beam splitter 51 for selectively transmitting and reflecting incident light according to the polarization of the light and a wave plate 53 for changing the polarization of incident light. Here, a quarter wave plate with respect to the wavelength of the light emitted from the light source is preferably used as the wave plate 53.

Thus, only light of one linear polarization among the light emitted from the light source 35 passes through the polarizing beam splitter 51, and the light becomes circularly polarized while passing through the wave plate 53. The circularly polarized light is reflected by the recording medium 30, revering the direction of the circular polarization, and is again incident upon the wave plate 53. The light becomes linearly polarized again, but with other linear polarization vector, while passing through the wave plate 53, and is finally all reflected by the polarizing beam splitter 51 to proceed to the main photodetector 81.

Preferably, a collimating lens 60 for focusing incident light is provided on the optical path between the optical path changing means 50 and the objective lens 70. Also, it is preferable that the focal distance and the arrangement of the objective lens 70 and the collimating lens 60 are optimized to form a light spot by focusing the light in the near-axis area on the recording surface 31 of the recording medium 30. That is, the collimating lens 60 changes divergent light in the near-axis area output from the light source 35 to parallel light. The objective lens 70 focuses incident parallel light to form a light spot on the recording surface 31 of the recording medium 30.

Figure 4:
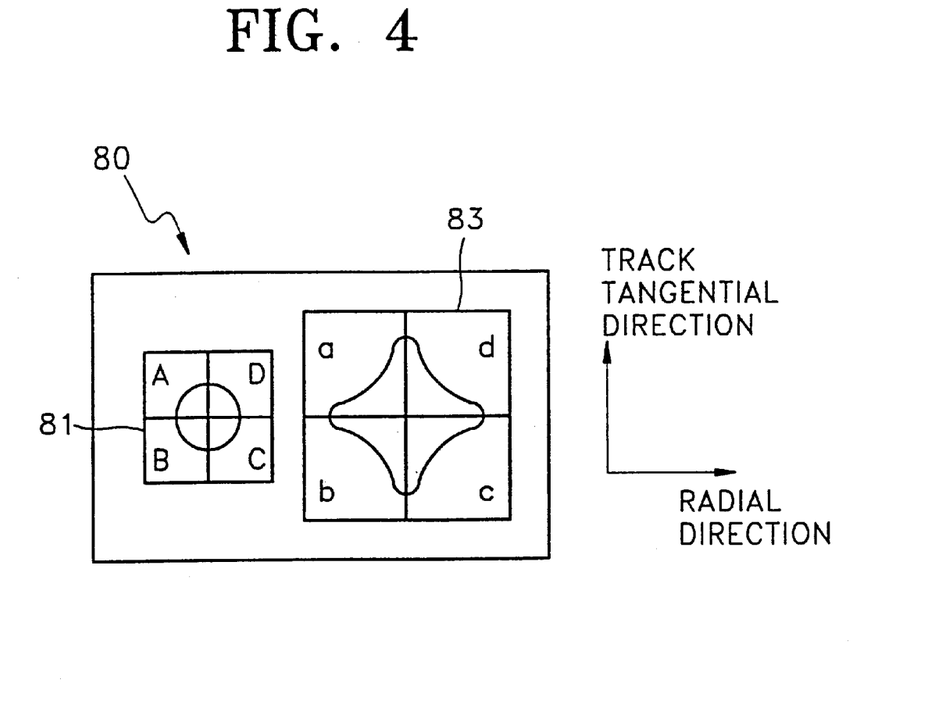
FIG. 4 is a plan view showing the light detecting unit of FIG. 3.

Preferably, the main photodetector 81, as shown in FIG. 4, consists of a plurality of split plates A, B, C and D for receiving incident light and changing received light to electrical signals independently, to detect information signals of the recording surface 31 and to detect error signals.

Referring back to FIG. 3, the inclination detecting means includes a holographic lens 40 for diffracting incident light and an inclination photodetector 83 for receiving the light reflected by the surface of the recording medium, in particular, the surface 33a of the protection layer 33, and detecting inclination of the recording medium 30.

Figure 5:
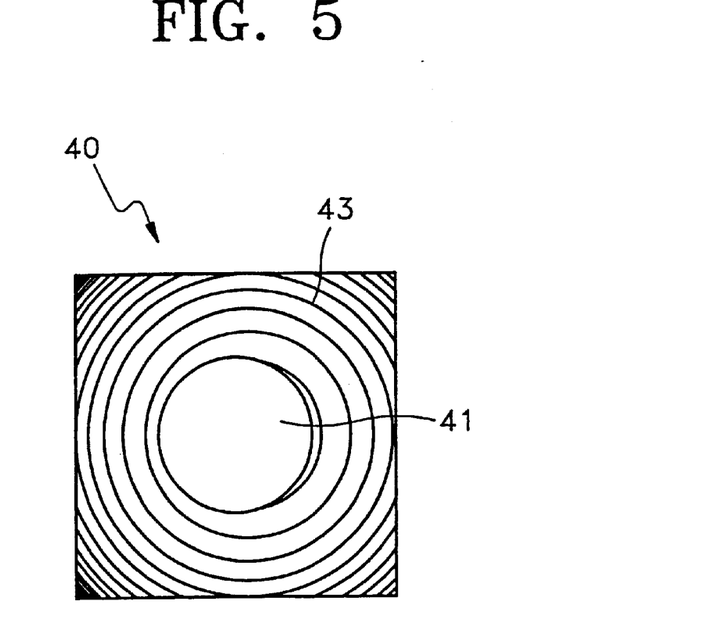
FIG. 5 is a plan view showing the configuration of the holographic lens of FIG. 3.

In this present embodiment, the holographic lens 40 is arranged between the light source 35 and the polarizing beam splitter 51. The holographic lens 40, as shown in FIG. 5, consists of a first transmitting portion 41 through which the light in the near-axis area of the light output from the light source 35 area passes and a second transmitting portion 43 formed around the first transmitting portion 41 through which the light in the far-axis area of the incident light passes.

The first transmitting portion 41 transmits the input light in the near-axis area without changing the direction of the light. The first transmitting portion 41 is formed of a transparent member or a through hole (not shown), or a holographic pattern (not shown) for diffracting incident light to the zero-th order, so that input light passes therethrough as it is. The light in the near-axis area passing through the first transmitting portion 41 is focused on the recording surface 31 of the recording medium 30 by the collimating lens 60 and the objective lens 70, to be used for recording/reproducing information signals.

A holographic pattern is formed on the second transmitting portion 43 to diffract and transmit and deflect incident light in $+1^{st}$ or $-1^{st}$ order. Here, the second transmitting portion 43 is preferably provided, as shown in FIG. 3, such that the focus of the light in the far-axis area can be disposed between the objective lens 70 and the recording medium 30, so that the diffracted light passing through the second transmitting portion 43 is focused by the collimating lens 60 and the objective lens 70 and then is incident on the surface 33a of the protection layer 33. The above focal position can be obtained by appropriately designing the interval of pitches of the holographic pattern to diffract incident light by an appropriate diffraction angle. Here, the focal position of the light in the far-axis area can be positioned between the surface 33a of the protection layer 33 and the recording surface 31.

When the second transmitting portion 43 having the above focal position is provided, the light in the near-axis area is incident on the objective lens 70 in parallel, while the light in the far-axis area is incident on the objective lens 70 to be inclined. Thus, the amount of the light reflected by the surface 33a of the protection layer 33 is much greater than that in the case of not providing the holographic lens 40.

Also, since the light in the far-axis area reflected by the surface 33a of the protection layer 33 has a different angle of divergence than the light in the near-axis area reflected by the recording surface 31 in an due to the difference of the focal position, and simultaneously, since the light in the far-axis area reflected by the surface 33a of the protection layer 33 is deflected while passing through the second transmitting portion 43, the light in the far-axis area reflected by the surface 33a of the protection layer 33 is reflected by the polarizing beam splitter 51 and received by the inclination photodetector 83 which is separately installed adjacent to the main photodetector 81.

The light in the far-axis area passing through the second transmitting portion 43 is deflected by diffraction so that the proceeding direction is altered. The light in the far-axis area passes through the collimating lens 60 becoming convergent and is incident on the objective lens 70 to be inclined. Then, the incident light is focused at a focal point between the objective lens 70 and the protection layer 33 is divergent and is incident on the protection layer 33. After a relatively large amount of light is reflected by the surface 33a of the protection layer 33, the light is again focused by the objective lens 70 to have a divergent angle different from the angle of incident on the protection layer 33, preferably, a divergent angle less than that of the light incident on the protection layer 33. Simultaneously, the light reflected by the surface 33a of the protection layer 33 and focused by the objective lens 70 has a divergent angle different from the light in the near-axis area focused by the objective lens 70 after being reflected by the recording surface 31, preferably, a divergent angle greater than that of the light in the near-axis area.

Thus, the light in the far-axis area which is reflected by the surface 33a of the protection layer 33 is focused by the collimating lens 60 and the proceeding path thereof is changed by the optical path changing means 50 so as to be incident on the inclination photodetector 83 at an angle with respect to the light in the near-axis area, for example.

Preferably, the inclination photodetector 83 includes quadrant plates a, b, c and d for independently converting incident light to electric signals to detect inclination in a track tangential direction and a radial direction of the recording medium 30. Here, boundary lines between the quadrant plates a, b, c and d of the inclination photodetector 83 are preferably arranged parallel to the track tangential direction and the radial direction of the recording medium 30 so that the quadrant plate forms a 2×2 matrix. Thus, when each of the quadrant plates a, b, c and d and a detection signal thereof are indicated by the same sign, an inclination detection signal in the track tangential direction is (a+d)−(b+c), while the inclination detection signal in the radial direction is (a+b)−(c+d).

Here, the inclination photodetector 83 may be formed of a plurality of split plates arranged in the track tangential direction or the radial direction, to detect inclination of the recording medium 30 in the track tangential direction or the radial direction.

Reference numeral 65 denotes a reflection prism for reflecting incident light and reference numeral 75 denotes a detection lens for focusing incident light to be received by the photodetectors 81 and 83.

The light in the near-axis area emitted from the light source 35 of the optical pickup device having the above structure, passes straight through the first transmitting portion 41 of the holographic lens 40 and is incident on the collimating lens 60 via the optical path changing means 50. The light is made parallel by the collimating lens 60 and focused by the objective lens 70, forming a light spot on the recording surface 31 of the recording medium 30. The light reflected by the recording surface 31 passes through the objective lens 70, the collimating lens 60 and the optical path changing means 50 and is received by the main photodetector 81.

The light in the far-axis area emitted from the light source 35, which passes through the second transmitting portion 43 of the holographic lens 40, is diffracted. Then, the light, of which the optical path is changed, passes through the optical path changing means 50 and is incident on the collimating lens 60. The light passes through the collimating lens 60 and the objective lens 70 and is incident on the surface 33a of the protection layer 33 of the recording medium 30. The light reflected by the surface 33a of the protection layer 33 passes through the objective lens 70, the collimating lens 60 and the optical path changing means 50 and is received by the inclination photodetector 83.

Figure 6:
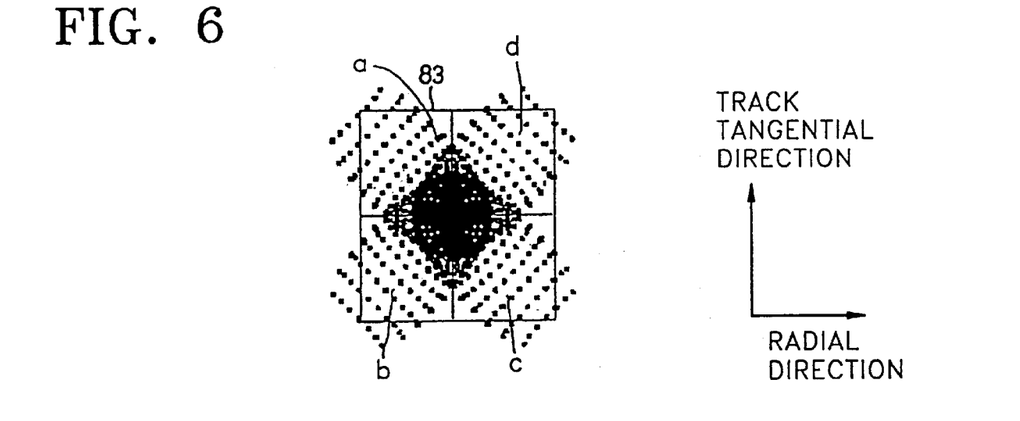
FIG. 6 is a view showing a light spot received by the inclination photodetector of FIG. 3.

When the recording medium 30 is not relatively inclined with respect to the objective lens 70, the light spot formed on the inclination photodetector 83 is symmetrical about the dividing boundaries of the quadrant plates a, b, c and d, as shown in FIG. 6, and the amount of light detected by each of the quadrant plates a, b, c and d is almost the same. Thus, inclination detection signal (a−b−c+d) in the track tangential direction and the inclination detection signal (a+b−c−d) in the radial direction becomes about zero.

Figure 7A:
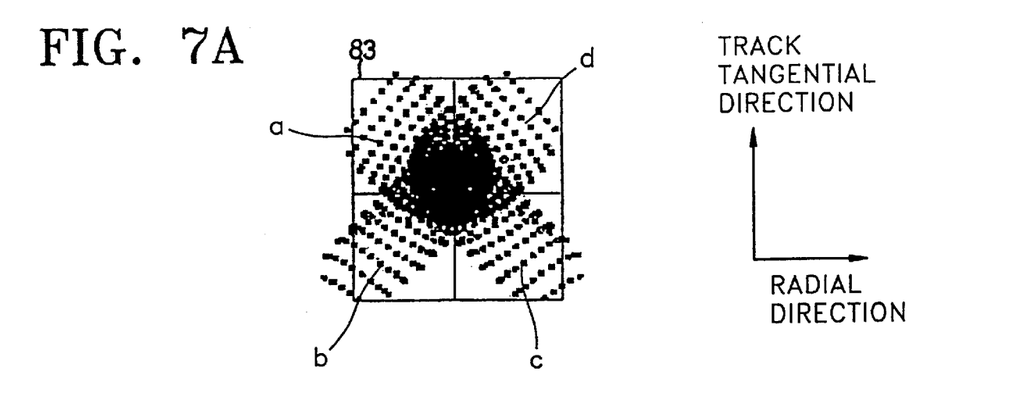
FIGS. 7A and 7B are views showing light spots received by the inclination photodetector of FIG. 4 when the recording medium is inclined and when the inclination is corrected, respectively.
Figure 7B:
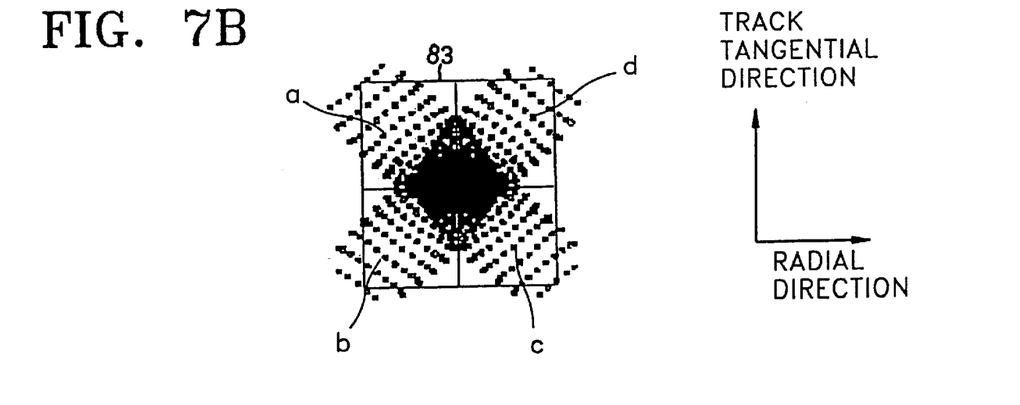

When the recording medium 30 is inclined, for example, by 1° in the track tangential direction, the light spot deviates toward the quadrant plates a and d, as shown in FIG. 7A, so that the inclination detection signal in the track tangential direction, (a+d)−(b+c), indicates a positive value. When the objective lens 70 is actuated to be inclined according to the inclination detection signal of the recording medium 30, the light spot moves toward the quadrant plates b and c to be positioned at the center of the inclination photodetector 83, as shown in FIG. 7B. The inclination detection signal in the track tangential direction, (a+d)−(b+c), becomes zero, which signifies that there is no relative inclination of the recording medium 30 in the track tangential direction with respect to the objective lens 70. The inclination of the recording medium 30 in the radial direction is detected according to the same principle, and the inclination of the recording medium 30 is corrected by controlling the inclination of the objective lens 70 according to the detection signal.

According to the optical pickup device according to one preferred embodiment of the present invention, the amount of inclination of the recording medium 30 is detected and the relative inclination of the recording medium 30 with respect to the objective lens 70 is corrected by actuating the objective lens 70 according to the detected inclination amount. When the objective lens 70 and the recording medium 30 are corrected to be parallel to each other, aberration, in particular, coma aberration, which may be generated due to the inclined recording medium 30 when an objective lens 70 has a relatively high numeric aperture, is removed so that recording/producing can be stably performed. Preferably, while being actuated to correct the inclination of the recording medium 30, the objective lens 70 maintains an on-track and on-focus state and simultaneously performs tracking such that the amount of movement can be kept within 30 $\mu$cm.

Figure 8:
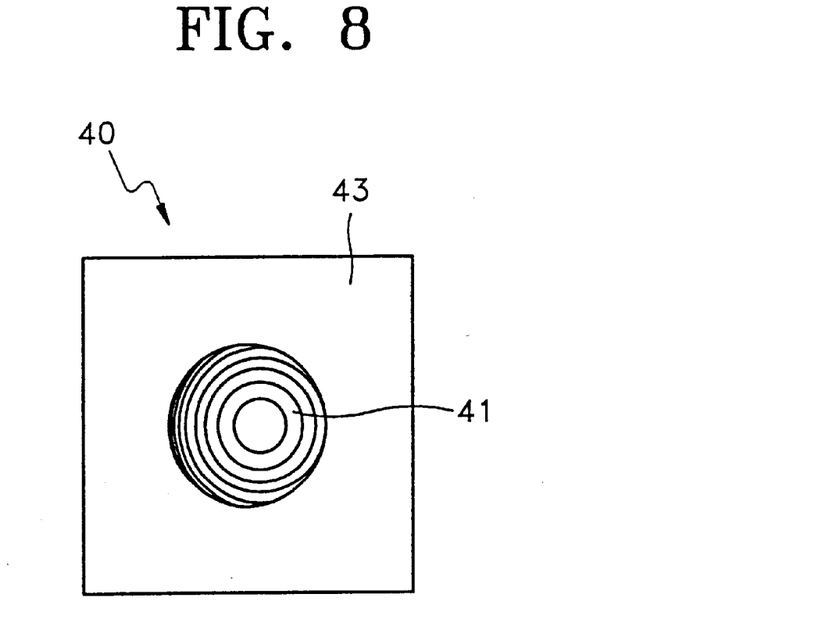
FIGS. 8 and 9 are plan views showing a holographic lens according to another preferred embodiment of the present invention.

In the holographic lens 40 of the optical pickup device according to one preferred embodiment of the present invention, as shown in FIG. 8, a holographic is pattern for diffracting incident light to $+1^{st}$ or $-1^{st}$ order may be formed on the first transmitting portion 41 and the second transmitting portion 43 may be formed of a transparent member or a holographic pattern (not shown) for diffracting and transmitting incident light to $0^{th}$ order. Here, the focal properties and arrangement of the collimating lens 60 and the objective lens 70 are set such that the light diffracting and passing through the first transmitting portion 41 can be formed as a light spot on the recording surface 31 of the recording medium 30.

When the holographic lens 40 is provided, the light in the near-axis area diffracting and passing through the first transmitting portion 41 is focused on the recording surface 31 of the recording medium 30 and reflected therefrom and then detected by the main photodetector 81. The light in the far-axis area passing straight through the second transmitting portion 43 is reflected by the surface 33a of the protection layer 33 of the recording medium 30 and then detected by the inclination photodetector 83.

Here, by moving the holographic lens 40 up and down, and left and right, the focal position and the effect of aberration of a light spot formed on the recording surface 31 of the recording medium 30 can be altered. Thus, the holographic lens 40 is actuated up and down, and left and right, by an actuator (not shown) which is installed at the holographic lens 40, according to the inclination detection signal of the recording medium 30, so that coma aberration generated due to the inclination of the recording medium 30 can be automatically corrected. In this case, the objective lens 70 needs not be actuated to correct the inclination.

Figure 9:
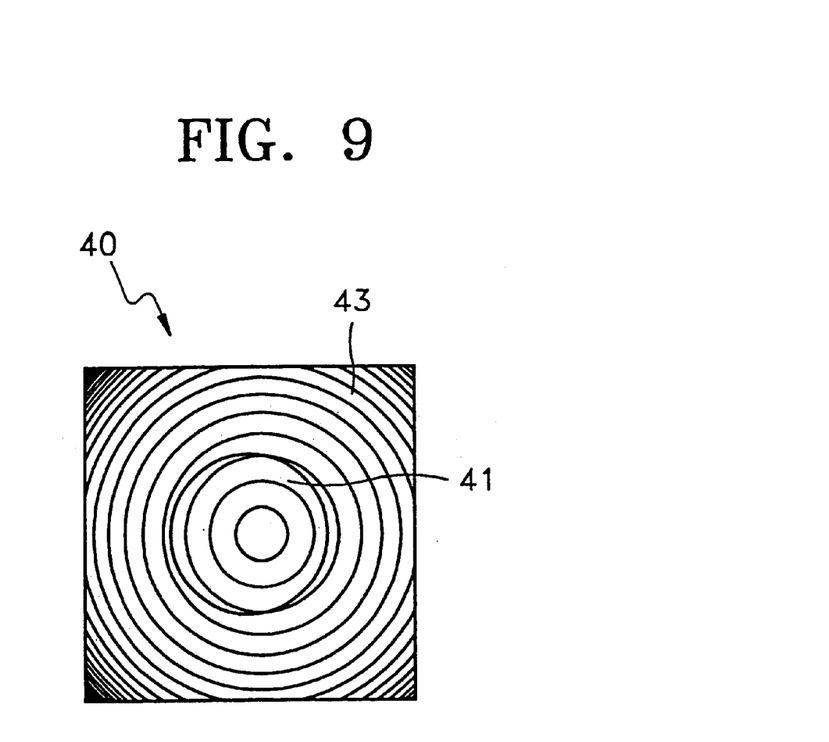

Alternatively, as shown in FIG. 9, a holographic pattern for diffracting and transmitting incident light may be formed on the entire surface of the holographic lens 40. Preferably, the holographic pattern is formed to diffract and transmit most incident light to zero-th order, and to diffract and transmit some light to $+1^{st}$ or $-1^{st}$ order. In this case, the zero-th order diffracted light is focused on the recording surface 31 of the recording medium 30 to be used for recording/reproducing information signals and the $+1^{st}$ or $-1^{st}$ order diffracted light is used for detecting the inclination of the recording medium 30.

In the above description, although it is assumed that the light in the far-axis area emitted from the light source 35 is emitted to the recording medium 30 via the objective lens 70, reflected by the recording medium 30, and then is received by the inclination photodetector 83 via the objective lens 70, the light in the far-axis area contributing to detecting relative inclination with respect to the objective lens 70 of the recording medium 30 may not pass through the objective lens 70. Also, the light in the far-axis area may be reflected by the recording surface 31 of the recording medium 30 and contribute to detecting inclination as above.

The optical pickup device according to the present invention is characteristic in that the light source for recording/reproduction can also be used as the light source for detecting inclination and that various preferred embodiments thereof are possible.

FIG. 10 shows the configuration of an optical pickup device according to another preferred embodiment of the present invention. Here, the same reference numerals as those in FIG. 3 indicate the same members having the same functions. In the case of the light which is emitted from the light source 35 for recording/reproduction, such as the light in the near-axis area shown in FIG. 3, part of the light is reflected by the surface 33a of the protection layer 33 as the light is incident on the recording medium 30. This embodiment has a characteristic feature of detecting the reflected portion of light to detect inclination of the recording medium 30.

Here, since the light reflected by the surface 33a of the protection layer 33 has a divergent angle greater than the light reflected by the recording surface 31 of the recording medium 30, the light lands around the light spot formed by light reflected by the recording surface 31 on a light receiving area of a light detecting unit 180.

Figure 11:
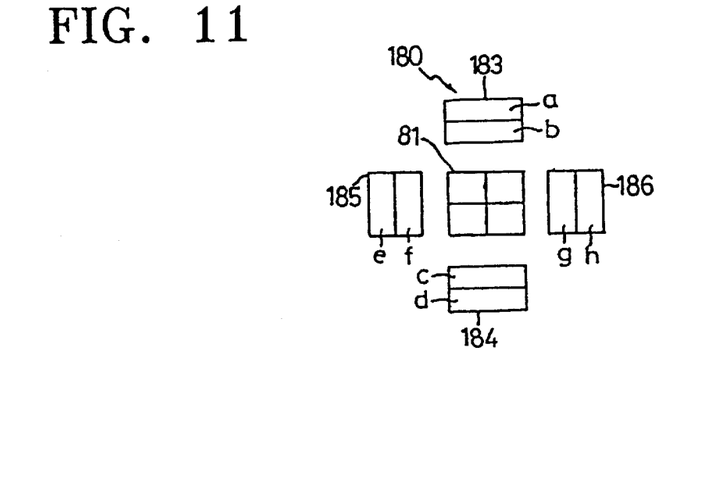
FIG. 11 is a plan view showing the light detecting unit of FIG. 10.

Thus, as an inclination detecting means to detect the reflected light, as shown in FIG. 11, at least one of the inclination photodetectors 183, 184, 185 and 186, having a plurality of spit plates a and b, c and d, e and f, and g and h arranged in a track tangential direction and/or a radial direction of the recording medium 30 at least one side of the main photodetector 81 is required. Here, in FIG. 11, in order to detect inclination in the track tangential direction and the radial direction of the recording medium 30, a pair of inclination photodetectors 183 and 184 are arranged at both sides of the main photodetector 81 along the track tangential direction of the recording medium and another pair of inclination photodetectors 185 and 186 are arranged at both sides along the radial direction.

Preferably, the inclination detecting means further includes a holographic lens 140 on the optical path between the optical path changing means 50 and the objective lens 70. The holographic lens 140 consists of a first transmitting portion 141 for transmitting the light reflected by the recording surface 31 of the recording medium 30 and a second transmitting portion 143, formed around the first transmitting portion 141, for transmitting most light reflected by the surface 33a of the protection layer 33 of the recording medium 30.

The first and second transmitting portions 141 and 143 are provided to selectively diffract and transmit light output from the recording medium 30. For example, the first transmitting portion 141 allows the light output from the recording medium 30 to pass straight through it, while the second transmitting portion 143 allows the light output from the recording medium 30 to diffract to $+1^{st}$ and $-1^{st}$ order and pass through it. The functions of the first and second transmitting portions 141 and 143 may be reversed.

Also, the first and second transmitting portions 141 and 143 are preferably provided to transmit the light emitted from the light source 35 straightly. Here, most of the light emitted from the light source 35 is input to the first transmitting portion 141.

Meanwhile, a collimating lens 160 for collimating the light emitted from the light source 35 and passing through the holographic lens 140 is further provided on the optical path between the holographic lens 140 and the objective lens 70. The collimating lens 160 preferably has a size corresponding to the first transmitting portion 141.

Thus, the light emitted from the light source 35 passes through the first transmitting portion 141, is made parallel by the collimating lens 160, and finally lands on the recording medium 30 via the objective lens 70. Also, the light reflected by the recording surface 31 is incident on the first transmitting portion 141 via the collimating lens 160. The light reflected by the surface 33a of the protection layer 33 is directly incident on the second transmitting portion 143 without passing through the collimating lens 160.

Figure 12A:
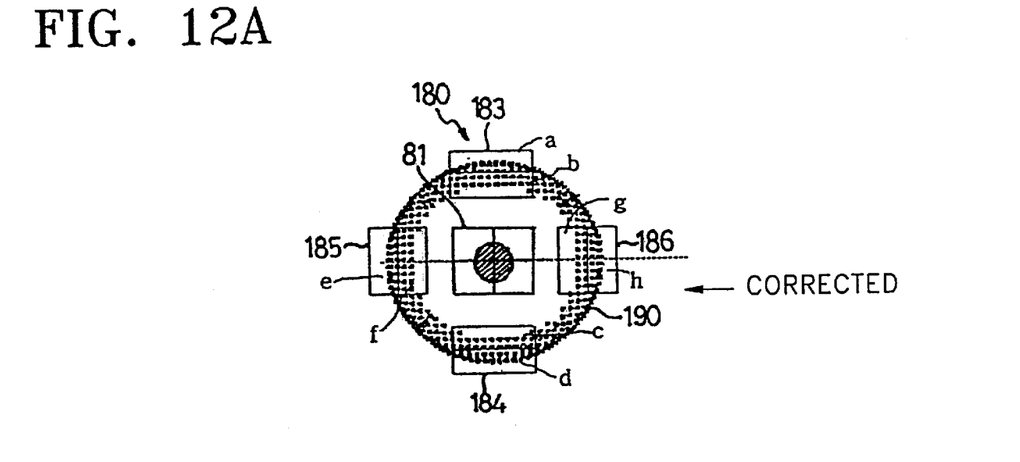
FIGS. 12A and 12B are views showing light spots received by the inclination photodetector of FIG. 11 when the recording medium is not inclined and when the recording is inclined, respectively.

Here, since the second transmitting portion 143 diffracts the light reflected by the surface 33a of the protection layer 33 and input by a large divergent angle, to $+1^{st}$ and $-1^{st}$ order, the light reflected by the surface 33a of the protection layer 33 is separated a predetermined distance from the light reflected by the recording surface 31, and forms a circular light 190 having a predetermine width around the main photodetector 81, as shown in FIG. 12A.

The holographic lens 140 and the collimating lens 160 enable the light reflected by the surface 33a of the protection layer 33 to be collected in a predetermined area so that the amounts of light detected by the inclination photodetectors 183, 184, 185 and 186 increase. Here, part of the light reflected by the recording surface 31 of the recording medium 30, not the light reflected by the surface 33a of the protection layer 33, passes through the second transmitting portion 143 to contribute to the detection of inclination of the recording medium 30. Also, the light passing through the second transmitting portion 143 after being reflected by the recording medium 30 may not pass through the objective lens 70.

Figure 12B:
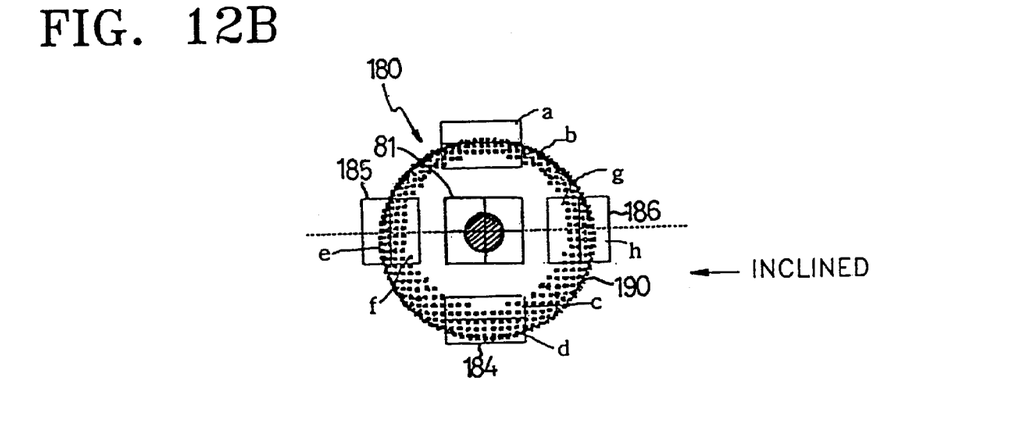

According to the optical pickup device having the above structure, when the recording medium 30 is not inclined, the circular light 190 reflected by the surface 33a of the protection layer 33 is symmetrically received by the inclination photodetectors 183, 184, 185 and 186, as shown in FIG. 12A. Here, the inclination detection signal value in the track tangential direction, (a−b)+(c−d), and the inclination detection signal value in the radial direction, (e−f)+(g−h), are about zero. When the recording medium 30 is inclined by about 1° in the track tangential direction, the circular light 190 is shifted toward the inclination photodetector 184 along the track tangential direction, as shown in FIG. 12B, and the inclination detection signal value in the track tangential direction, (a−b)+(c−d), is negative. Thus, the relative inclination between the objective lens 70 and the recording medium 30 is corrected by adjusting the inclination of the objective lens 70 corresponding to the inclination detection signal value.

Here, in the above description and drawings, the inclination photodetectors 83, 183, 184, 185 and 186 according to the present invention are installed one at each side of the main photodetector 81 to receive the light reflected by the surface 33a of the protection layer 33 of the recording medium 30 and passing through the optical path changing means 50. However, various embodiments, in one of which the inclination photodetector may be installed at the outer circumference of the objective lens 70 facing the recording medium 30, are possible. That is, the technical concept of the present invention lies in that the inclination of the recording medium 30 is detected by receiving the light reflected by the surface 33a of the protection layer 33 or the recording surface 31 of the recording medium 30. Of course, the present invention is not limited to the above described preferred embodiments.

As described above, in the optical pickup device according to the present invention, since the inclination of the recording medium 30 is detected by receiving the light reflected by the surface 33a of the protection layer 33 or the recording surface 31 of the recording medium 30, relative inclination between the objective lens 70 and the recording medium 30 can be detected even when the angle of relative inclination is equal to or greater than 1° which is relatively large.

Also, the inclination of the recording medium 30 can be detected almost regardless of the thickness of the protection layer 33 of the recording medium 33. That is, in the case of a CD having a 1.2 mm thick protection layer and a DVD having a 0.6 mm thick protection layer, as well as an HD-DVD which is expected to have a thin protection layer of less than 0.6 mm, for example, 0.1 mm, the optical pickup device according to the present invention can detect the relative inclination between the objective lens 70 and the recording medium 30.

Furthermore, according to the present invention, since the inclination of the recording medium 30 is detected using the light emitted from the light source 35 for recording/reproducing and reflected by the surface 33a of the protection layer 33 or the recording surface 31 of the recording medium 30, without an additional tilt sensor, the number of parts is reduced and the structure of the device is simplified.

What is claimed is:

1. An optical pickup device comprising:
    a light source for generating and emitting light;
    optical path changing means for changing a optical path of incident light;
    an objective lens for focusing incident light on a recording medium which has a recording surface where information is recorded and a protection layer at a side where light is input for protecting the recording surface;
    a main photodetector for detecting at least one of an information signal and an error signal by receiving the light reflected by the recording surface of the recording medium and passing through the objective lens and the optical path changing means; and
    an inclination detecting unit for detecting inclination of the recording medium by receiving the light emitted from the light source and reflected by the surface of the protection layer or the recording surface of the recording medium and passing through the objective lens.

2. An optical pickup device comprising:
    a light source for generating and emitting light;
    optical path changing means for changing a optical path of incident light;
    an objective lens for focusing incident light on a recording medium which has a recording surface where information is recorded and a protection layer at a side where light is input, for protecting the recording surface;
    a main photodetector for detecting at least one of an information signal and an error signal by receiving the light reflected by the recording surface of the recording medium and passing through the objective lens and the optical path changing means; and
    an inclination detecting unit for detecting inclination of the recording medium by receiving the light emitted from the light source and reflected by the surface of the protection layer or the recording surface of the recording medium, wherein the inclination detecting unit comprises:
    a holographic lens, disposed on the optical path between the light source and the optical path changing means, for diffracting and transmitting light input from the light source; and
    an inclination photodetector, disposed at one side of the main photodetector to receive incident light reflected by the surface of the protection layer and passing through the objective lens and the optical path changing means, and formed of a plurality of split plates, each performing photoelectric-conversion independently, the split plates being arranged in a track tangential direction and/or a radial direction of the recording medium.

3. The optical pickup device as claimed in claim 2, wherein the holographic lens comprises:
    a first transmitting portion for transmitting light a portion of the light emitted from the light source within a near-axis area used for recording and reproducing information signals; and
    a second transmitting portion, formed around the first transmitting portion, for transmitting a portion of the incident light withing a far-axis area, wherein one of the first and second transmitting portions allows incident light to pass straight therethrough and the other one diffracts and transmits the incident light to $+1^{st}$ or $-1^{st}$ order.

4. The optical pickup device as claimed in claim 3, wherein coma aberration generated due to inclination of the recording medium is automatically corrected by actuating the holographic lens according to a recording medium inclination detection signal of the inclination photodetector.

5. The optical pickup device as claimed in claim 2, wherein the inclination photodetector is formed of quadrant plates in a 2×2 matrix, the boundaries of the split plates being parallel to the track tangential direction and the radial direction, so that inclination of the recording medium in the track tangential direction and the radial direction can be detected.

6. An optical pickup device comprising:
    a light source for generating and emitting light;
    optical path changing means for changing a optical path of incident light;
    an objective lens for focusing incident light on a recording medium which has a recording surface where information is recorded and a protection layer at a side where light is input, for protecting the recording surface;
    a main photodetector for detecting at least one of an information signal and an error signal by receiving the light reflected by the recording surface of the recording medium and passing through the objective lens and the optical path changing means; and
    an inclination detecting unit for detecting inclination of the recording medium by receiving the light emitted from the light source and reflected by the surface of the protection layer or the recording surface of the recording medium, wherein the inclination detecting unit comprises at least one inclination photodetector having a plurality of quadrant plates arranged in at least one of a track tangential direction and a radial direction of the recording medium at least one side of the main photodetector, to detect the light reflected by the surface of the protection layer.

7. The optical pickup device as claimed in claim 6, wherein the inclination detecting unit further comprises a holographic lens which is disposed on the optical path between the optical path changing unit and the objective lens and includes a first transmitting portion which is provided such that most light transmitting the first transmitting portion is the light reflected by the recording surface of the recording medium, and a second transmitting portion, formed around the first transmitting portion, for transmitting light reflected by the surface of the protection layer of the recording medium, wherein one of the first and second transmitting portions allows incident light emitted from the recording medium to pass straight therethrough and the other one diffracts and transmits the incident light emitted from the recording medium to $+1^{st}$ or $-1^{st}$ order.

8. The optical pickup device as claimed in claim 7, further comprising a collimating lens, disposed on the optical path between the holographic lens and the objective lens, for collimating the light output from the light source and passing straight through the first transmitting portion, so that light, excluding a part thereof from the outer circumference of the incident light reflected by the recording medium, can pass the collimating lens.

9. The optical pickup device as claimed in claim 6, wherein the inclination photodetector is provided at both sides of the main photodetector along at least one of a track tangential direction and a the radial direction.

* * * * *